US012432485B2

(12) United States Patent
Okamoto

(10) Patent No.: US 12,432,485 B2
(45) Date of Patent: Sep. 30, 2025

(54) CONTROL SYSTEM, EARPHONE, AND CONTROL METHOD

(71) Applicant: PANASONIC INTELLECTUAL PROPERTY MANAGEMENT CO., LTD., Osaka (JP)

(72) Inventor: Naoko Okamoto, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 230 days.

(21) Appl. No.: 18/332,542

(22) Filed: Jun. 9, 2023

(65) Prior Publication Data

US 2023/0403498 A1 Dec. 14, 2023

(30) Foreign Application Priority Data

Jun. 13, 2022 (JP) ................................ 2022-095154

(51) Int. Cl.
*H04R 1/10* (2006.01)

(52) U.S. Cl.
CPC ......... *H04R 1/1083* (2013.01); *H04R 1/1016* (2013.01); *H04R 1/1041* (2013.01); *H04R 1/1075* (2013.01); *H04R 2420/07* (2013.01)

(58) Field of Classification Search
CPC ............ H04R 2460/05; H04R 2460/09; H04R 2460/11; A61B 5/1123
See application file for complete search history.

(56) References Cited

U.S. PATENT DOCUMENTS 8,295,505 B2 * 10/2012 Weinans .............. H04R 1/1041 381/328
9,389,316 B2 * 7/2016 MacGougan ........... G01S 19/26
10,638,210 B1 * 4/2020 El Guindi ................ H04R 1/08
10,652,646 B2 * 5/2020 Grinker ............ G10K 11/17885
10,687,153 B2 * 6/2020 Albahri ................ H04R 25/405
11,323,797 B2 * 5/2022 Liang .................... H04R 1/1016
11,516,601 B2 * 11/2022 Aase .................... H04R 25/505
(Continued)

FOREIGN PATENT DOCUMENTS

CN 109254750 A * 1/2019 ............ G06F 3/165
JP 2009525629 A 7/2009
JP 2012249185 A 12/2012

OTHER PUBLICATIONS

Extended European Search Report dated Nov. 2, 2023, for the corresponding European Patent Application No. 23178657.5, 11 pages.

*Primary Examiner* — Ryan Robinson
(74) *Attorney, Agent, or Firm* — Seed Intellectual Property Law Group LLP

(57) ABSTRACT

A control system includes earphones including a housing having a space therein and an air-permeable path from one end of an ear canal of a user to one end of the ambient environment, and an opening and closing valve accommodated in the housing and capable of blocking a part of the path, the earphones being worn on left and right ears of the user, respectively, and a wireless terminal carried by the user. The wireless terminal transmits a signal indicating that the moving speed is a speed within the predetermined range to the earphones when determining that a moving speed of the user is within a predetermined range. The earphones control the opening and closing valve based on the signal acquired from the wireless terminal.

11 Claims, 10 Drawing Sheets

(56) References Cited

U.S. PATENT DOCUMENTS

| | | | | |
|---|---|---|---|---|
| 11,985,483 | B2 * | 5/2024 | Naumann | H04R 25/603 |
| 12,094,444 | B2 * | 9/2024 | Zheng | H04R 3/005 |
| 2007/0177753 | A1 | 8/2007 | Weinans et al. | |
| 2013/0245987 | A1 * | 9/2013 | Izumida | G01P 15/18<br>702/141 |
| 2019/0215621 | A1 | 7/2019 | Albahri et al. | |
| 2022/0167099 | A1 * | 5/2022 | Feilner | G06F 3/165 |

* cited by examiner

CONTROL SYSTEM, EARPHONE, AND CONTROL METHOD

CROSS-REFERENCE TO RELATED APPLICATIONS

This application is based on and claims priority under 35 USC 119 from Japanese Patent Application No. 2022-095154 filed on Jun. 13, 2022, the contents of which are incorporated herein by reference.

TECHNICAL FIELD

The present disclosure relates to a control system, an earphone, and a control method.

BACKGROUND ART

Patent Literature 1 discloses an earphone with a leakage control function, which can be switched between states with and without leakage to adapt to different listening situations. The earphone is shaped and configured to be disposed to substantially cover an ear canal. The earphone includes a housing that accommodates a speaker element emitting sound to the ear canal and has a channel extending from an inner end facing the ear canal to an outer end facing a peripheral side. The earphone includes a closure means capable of switching between a closed state in which the channel is substantially closed and an open state in which the channel transmits sound from the surroundings.

CITATION LIST

Patent Literature

Patent Literature 1: JP2009-525629A

SUMMARY OF INVENTION

In the related art, earphones are respectively inserted into left and right ears of a user to seal ear canals of the user, thereby allowing the user to listen to an output sound in a state in which ambient environmental noise is blocked. However, when the user speaks while wearing the earphones (for example, when making a phone call), the user may have a feeling that his or her voice is muffled and may be difficult to talk.

In Patent Literature 1, the earphone controls the channel of the housing to change between sealed and non-sealed states of the ear canal of the user. The earphone disclosed in Patent Literature 1 closes the channel and seals an ear of the user when playing music, and opens the channel and opens the ear of the user when the user is making a phone call.

On the other hand, in a case where the ear canal is sealed by the earphone when the earphone is playing music, a vibration sound caused by movement of the user may be reflected in a body of the user, and the user may feel uncomfortable. The vibration sound includes breathing sound when the user is moving. Therefore, when the user wears the earphone on the ear, it is necessary to reduce the reflection of the vibration sound in the body of the user caused by the movement of the user.

The present disclosure has been made in view of the above situations in the related art, and an object of the present disclosure is to control a sealed state or an open state of an earphone worn on an ear of a user according to a movement state of the user and prevent the user from feeling uncomfortable.

The present disclosure provide a control system including earphones and a wireless terminal carried by the user. The earphones include a housing having a space therein and an air-permeable path from one end of an ear canal of a user to one end of the ambient environment located at another end of the ear canal, and an opening and closing valve accommodated in the housing and capable of blocking a part of the path. The earphones are worn on left and right ears of the user, respectively. When determining that a moving speed of the user is within a predetermined range, the wireless terminal transmits a signal indicating that the moving speed is a speed within the predetermined range to the earphones. The earphones control the opening and closing valve based on the signal acquired from the wireless terminal.

The present disclosure provide an earphone communicably connected to a wireless terminal. The earphone includes a housing having a space therein and an air-permeable path from one end of an ear canal of a user to one end of the ambient environment located at another end of the ear canal, and an opening and closing valve accommodated in the housing and capable of blocking a part of the path. When a signal indicating that a moving speed of the user is within a predetermined range is acquired from the wireless terminal, the opening and closing valve is controlled based on the signal.

The present disclosure provide a control method for controlling earphones and a wireless terminal, the earphones including a housing having a space therein and an air-permeable path from one end of an ear canal of a user to one end of the ambient environment located at another end of the ear canal, and an opening and closing valve accommodated in the housing and capable of blocking a part of the path, the earphones being worn on left and right ears of the user, respectively. The control method includes transmitting, by the wireless terminal, a signal indicating that the moving speed is within the predetermined range to the earphones when determining that a moving speed of the user is within a predetermined range, and controlling, by the earphones, the opening and closing valve based on the signal acquired from the wireless terminal.

These comprehensive or specific aspects may be implemented by a system, a device, a method, an integrated circuit, a computer program, a recording medium, or any combination of the system, the device, the method, the integrated circuit, the computer program, and the recording medium.

According to the present disclosure, it is possible to control the sealed state or the open state of the earphone worn on the ear of the user according to the movement state of the user and to prevent the user from feeling uncomfortable.

DESCRIPTION OF EMBODIMENTS

Hereinafter, a control system, an earphone, and a control method according to an embodiment of the present disclosure will be described in detail with reference to the drawings. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure and are not intended to limit the subject matter described in the claims.

Figure 1:
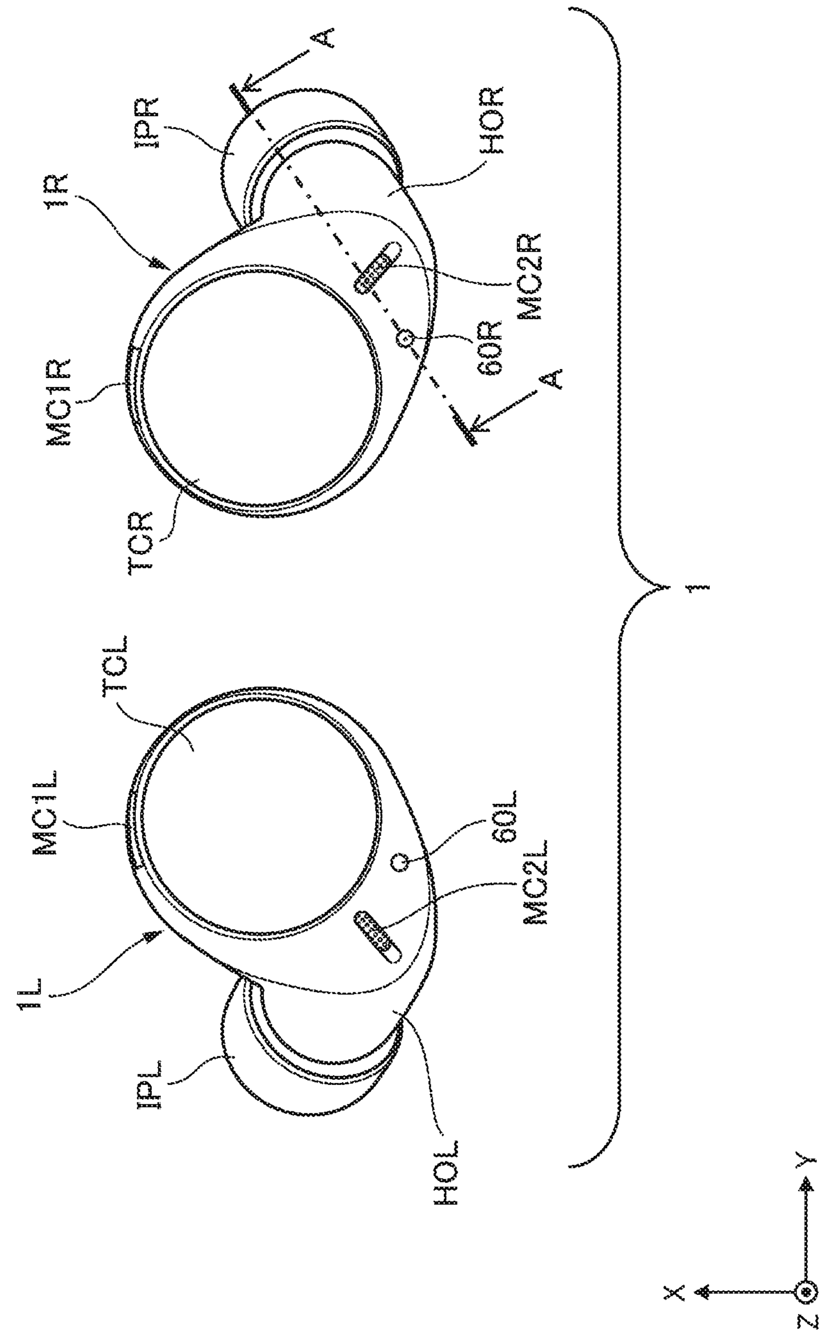
FIG. 1 is a front view of an earphone.
Figure 2:
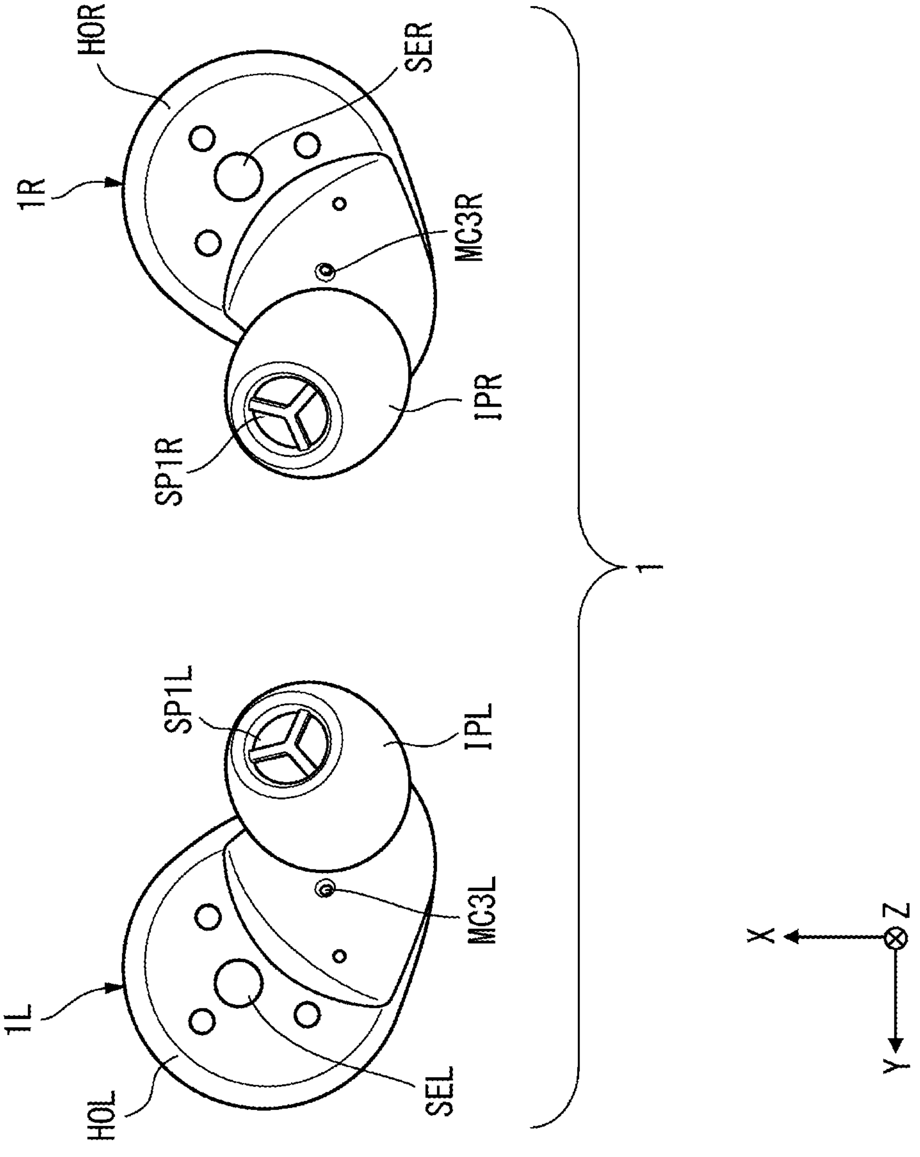
FIG. 2 is a rear view of the earphone.

First, a hardware configuration of the earphone will be described with reference to FIGS. 1 and 2. FIG. 1 is a front view of the earphone. FIG. 2 is a rear view of the earphone.

For convenience of description, an X axis and a Y axis are defined along a plane parallel to a surface of a touch sensor TCL of an earphone 1L as shown in FIG. 1, and an axis orthogonal to the surface of the touch sensor TCL is defined as a Z axis. When a microphone MC1L of the touch sensor TCL is taken as an upper end with respect to the earphone 1L and a microphone MC2L opposite to the microphone MC1L of the touch sensor TCL is taken as a lower end, an axis extending from the lower end to the upper end is taken as the X axis. An axis perpendicular to the X axis and the Z axis is defined as the Y axis. In the present embodiment, the orientation of the earphone 1L shown in FIG. 1 is defined as the front view. The expressions related to these directions are used for convenience of description and are not intended to limit the attitude of the structure in actual use. The same applies to other drawings.

In the present embodiment, in a pair of left and right earphones 1L and 1R, configurations of the left ear earphone 1L and the right ear earphone 1R are the same. The reference numerals of the same components are represented by adding "L" to the end of the left ear earphone 1L and adding "R" to the end of the right ear earphone 1R. In the following description, only the left earphone 1L will be described and the description of the right earphone 1R will be omitted.

An earphone 1 includes the earphones 1L and 1R, which are worn on left and right ears of a user, respectively, and a plurality of earpieces having different sizes are attached to one end of each of the earphones 1L and 1R in a replaceable manner. The earphone 1 may be implemented with two independently operable earphones (that is, the earphone 1L and the earphone 1R) including the earphone 1L worn on the left ear of the user and the earphone 1R worn on the right ear of the user. In this case, the earphone 1L and the earphone 1R can communicate wirelessly (for example, short-range wireless communication such as Bluetooth (registered trademark)). Alternatively, the earphone 1 may be implemented with a pair of earphones in which the earphone 1L and the earphone 1R are connected by a wire (in other words, a cable such as a wire).

As shown in FIG. 1, the earphone 1L is an inner acoustic device that is worn on the ear of the user and used and receives sound data (for example, music data) transmitted wirelessly (for example, short-range wireless communication such as Bluetooth (registered trademark)) from an external device such as a smartphone or a portable music player carried by the user. The earphone 1L acoustically outputs a sound signal based on the received sound data. In addition, the earphone 1L is placed on a cradle (not shown) which is a charging case when not in use. In a case where a battery B1L (FIG. 3) built in the earphone 1L is not fully charged, when the earphone 1L is placed on a predetermined placement position of the cradle, the battery B1L built in the earphone is charged based on the power transmitted from the cradle.

A housing HOL is provided as a structural member of the earphone 1L. The housing HOL is provided as a composite of materials such as synthetic resin, metal, and ceramic, and an accommodation space in which various members constituting the earphone 1L are accommodated is formed in the housing HOL. The housing HOL is provided with a mounting cylindrical portion FCL1 (see FIGS. 3 and 4) communicating with the accommodation space. The mounting cylindrical portion FCL1 is provided on one end of the housing HOL opposite to the touch sensor TCL to be described later.

The earphone 1L includes an earpiece IPL attached to a main body of the earphone 1L. For example, the earphone 1L is held in a state of being inserted into an ear canal of the ear of the user by the earpiece IPL, and this held state is a use state of the earphone 1L.

The earpiece IPL is made of a flexible member such as silicon and is injection-molded with an inner cylindrical portion (not shown) and an outer cylindrical portion (not shown). The earpiece IPL is inserted into and fixed to the mounting cylindrical portion FCL1 of the housing HOL with the inner cylindrical portion thereof, and is provided to be replaceable (detachable) with respect to the mounting cylindrical portion FCL1 of the housing HOL. The earpiece IPL is worn on the ear canal of the user with the outer cylindrical portion thereof, and is elastically deformed according to a shape of the ear canal on which the earpiece IPL is worn. By this elastic deformation, the earpiece IPL is held in the ear canal of the user. The earpiece IPL has a plurality of different sizes. As for the earpiece IPL, an earpiece of any size among a plurality of earpieces of different sizes is attached to the earphone 1L and worn on the left ear of the user.

As an example of an operation input unit, the touch sensor TCL is provided on the other end opposite to the one end of the housing HOL on which the earpiece IPL is disposed as shown in FIG. 1. The touch sensor TCL is a sensor element having a touch sensor function of detecting an input operation (for example, a touch operation) of the user. The sensor element is, for example, an electrode of a capacitive touch sensor. The touch sensor TCL may be formed as, for example, a circular surface, or may be formed as, for example, an elliptical surface. The touch sensor TCL may be formed as a rectangular surface.

Examples of the touch operation performed on the touch sensor TCL by a finger of the user include the following operations. When a touch operation is performed for a short time, the earphone 1L may instruct an external device to perform any one of playing music, stopping music, skipping forward, skipping back, or the like. When a touch operation (a long-press touch) is performed for a long time, the earphone 1L may perform a pairing operation or the like for performing wireless communication with an external device such as a smartphone using Bluetooth (registered trademark) or the like. When the user touches a surface of the touch sensor TCL with a finger (a swiping operation), the earphone 1L may perform, for example, volume adjustment of music being played.

An opening 60L is a hole formed in the housing HOL and communicates with an air-permeable path from one end of the ear canal of the user to the other end of the ambient environment. A cross-sectional example of a detailed structure of the opening 60L will be described later with reference to FIGS. 3 and 4.

The earphone 1L includes a plurality of microphones (the microphone MC1L, the microphone MC2L, and a microphone MC3L) as electric/electronic members. The plurality of microphones are accommodated in the accommodation space (not shown) of the housing HOL.

As shown in FIG. 1, the microphone MC1L is provided to be exposed on the surface or in the vicinity of the surface of the housing HOL, and is disposed to be capable of picking up an ambient sound or the like outside the earphone 1L. That is, the microphone MC1L can detect an ambient sound of the user in a state in which the earphone 1L is worn on the ear of the user. The microphone MC1L converts the outside ambient sound into an electric signal (sound signal) and sends the electric signal to a sound signal input and output control unit S1L.

As shown in FIG. 1, the microphone MC2L is provided to be exposed on the surface or in the vicinity of the surface of the housing HOL, and is disposed to be capable of picking up a voice signal based on a speech of the user wearing the earphone 1L. Therefore, the earphone 1L can implement a hands-free call in a state in which the earphone 1L can communicate with a mobile phone device such as a smartphone F1 of the user. The microphone MC2L is implemented with a microphone device capable of picking up a voice (that is, detecting a voice signal) generated based on a speech of the user. The microphone MC2L picks up a voice generated based on a speech of the user, converts the voice into an electric signal, and transmits the electric signal to the sound signal input and output control unit S1L. The microphone MC2L is disposed such that an extending direction of the earphone 1L faces a mouth of the user when the earphone 1L is inserted into the left ear of the user (see FIG. 1), and is disposed at a position below the touch sensor TCL (that is, in a −X direction). The voice of the user is picked up by the microphone MC2L and converted into an electric signal, and the presence or absence of a speech of the user can be detected by the microphone MC2L according to the magnitude of the electric signal.

As shown in FIG. 2, the microphone MC3L is disposed in a surface in the vicinity of the mounting cylindrical portion FCL1 of the housing HOL, and is disposed as close as possible to an ear canal of the left ear of the user when the earphone 1L is inserted into the left ear of the user. The microphone MC3L converts a sound leaking from between the left ear of the user and the earpiece IPL in a state in which the earphone 1L is worn on the left ear of the user into an electric signal (sound signal) and transmits the electric signal to the sound signal input and output control unit S1L.

As shown in FIG. 2, a speaker SP1L is disposed in the mounting cylindrical portion FCL1 of the housing HOL. The speaker SP1L is an electronic component and acoustically outputs sound data (for example, music data) wirelessly transmitted from an external device. In the housing HOL, a front surface of the speaker SP1L (in other words, a sound output surface of a sound to be acoustically output) faces the mounting cylindrical portion FCL1 of the housing HOL covered with the earpiece IPL. As a result, the music data acoustically output from the speaker SP1L is further transmitted from an ear hole (for example, an external ear) of the user to the ear canal of the external ear and an eardrum of a middle ear, and the user can listen to the music data.

A wearing sensor SEL is implemented with a device that detects whether the earphone 1L is worn on the left ear of the user and is implemented with, for example, an infrared sensor or an electrostatic sensor. In the case of an infrared sensor, if the earphone 1L is worn on the left ear of the user, the wearing sensor SEL can detect the wearing of the earphone 1L on the left ear of the user by receiving infrared rays emitted from the wearing sensor SEL and reflected inside the left ear. If the earphone 1L is not worn on the left ear of the user, the wearing sensor SEL can detect that the earphone 1L is not worn on the left ear of the user by not receiving infrared rays as the infrared rays emitted from the wearing sensor SEL are not reflected. On the other hand, in the case of an electrostatic sensor, if the earphone 1L is worn on the left ear of the user, the wearing sensor SEL can detect the wearing on the left ear of the user by determining that a change value of an electrostatic capacitance according to a distance from the earphone 1L to the inside of the left ear of the user is greater than a threshold retained by the wearing sensor SEL. If the earphone 1L is not worn on the left ear of the user, the wearing sensor SEL can detect that the earphone 1L is not worn on the left ear of the user by determining that the change value of the electrostatic capacitance is smaller than the threshold retained by the wearing sensor SEL. The wearing sensor SEL is provided at a position facing the ear canal of the left ear of the user when the earphone 1L is inserted into the left ear and on a back side of the touch sensor TCL.

Figure 3:
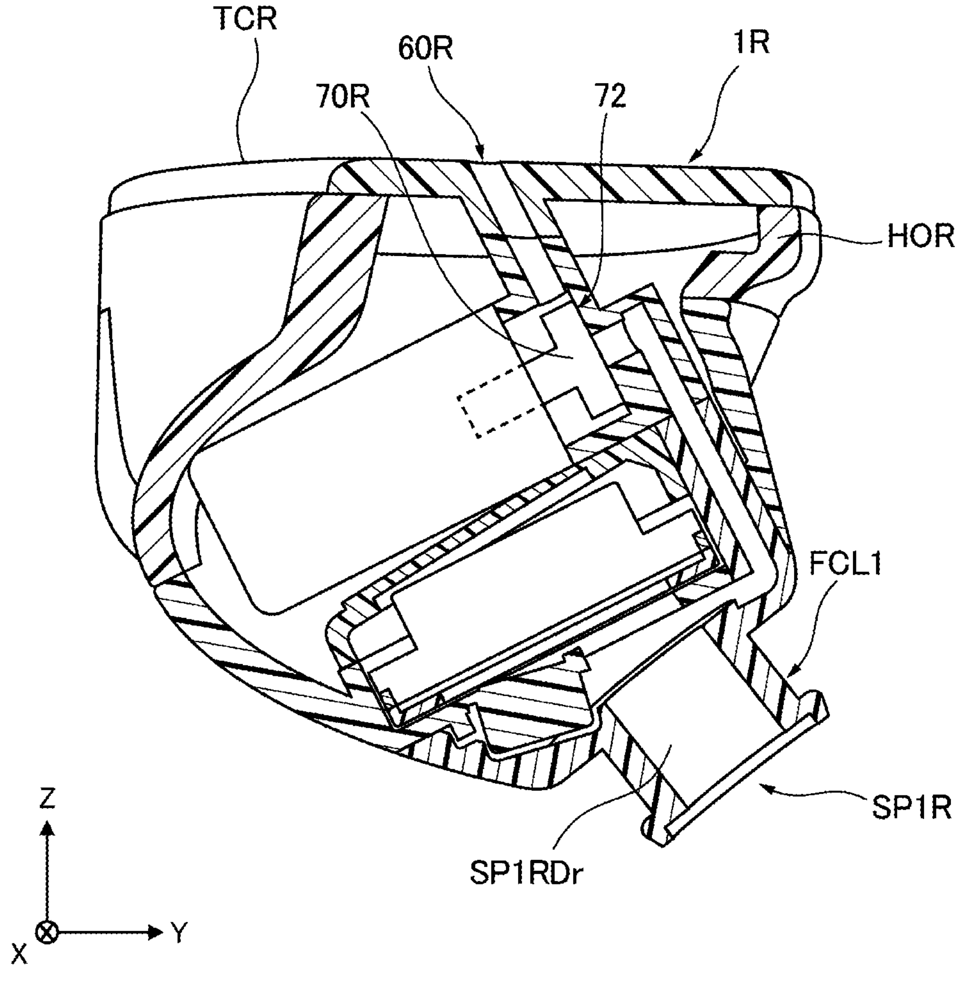
FIG. 3 is a diagram of an opening and closing valve in a closed state.
Figure 4:
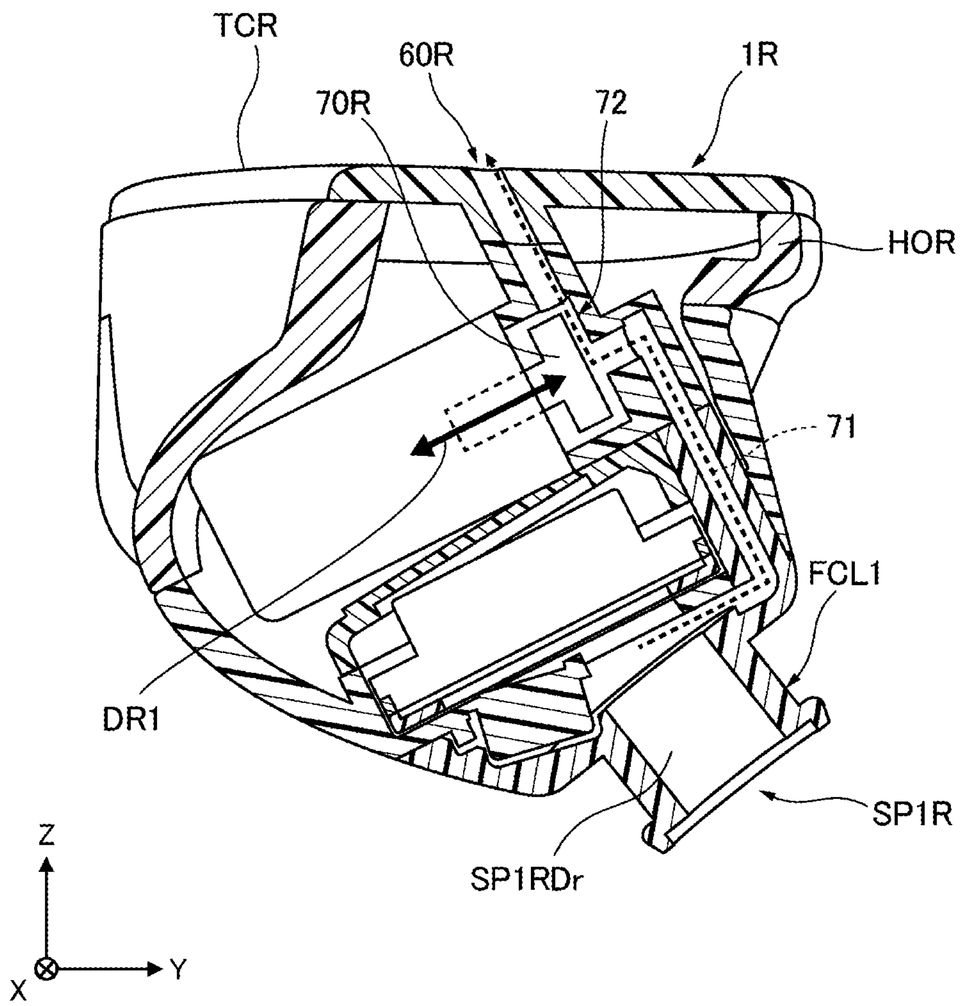
FIG. 4 is a diagram of the opening and closing valve in an open state.

Next, an open state and a closed state of an opening and closing valve will be described with reference to FIGS. 3 and 4. FIG. 3 is a diagram of the opening and closing valve in the closed state. FIG. 4 is a diagram of the opening and closing valve in the open state. FIGS. 3 and 4 are diagrams of the earphone 1R, and the earphone 1L also has a similar structure, and thus description thereof is omitted here. In FIGS. 3 and 4, illustration of earpieces IPL and IPR (see FIGS. 1 and 2) is omitted.

Cross-sectional views shown in FIGS. 3 and 4 are A-A cross-sectional views of the earphone 1R according to FIG. 1.

An opening and closing valve 70R is a device having a movable mechanism that controls air passing through a path 71. The opening and closing valve 70R switches between an open state and a sealed state of the path 71 for releasing a sound remaining in the housing HOR to the outside of the housing HOR. The sound remaining in the housing HOR is, for example, an echo sound of a sound output from a driver SP1RDr, or a transmission sound acoustically transmitted to the vicinity of the right ear through a body of the user due to a speech of the user. These sounds cause discomfort or difficulty in hearing external sounds when the user speaks while wearing the earphone 1R. An operation (specifically, opening and closing) of the opening and closing valve 70R is controlled by an earphone control unit S2R. The valve may be, for example, a gate valve shown in FIG. 3, a globe valve, a needle valve, a ball valve, or a butterfly valve.

The opening and closing valve 70R is movable in a direction DR1 based on a signal (control signal) from the earphone control unit S2L. The opening and closing valve 70R is movable in the direction DR1 and can block the path 71 and be in close contact with a wall surface 72 by coming into contact with the wall surface 72. A state in which the opening and closing valve 70 shown in FIG. 3 is in contact with the wall surface 72 and blocks the path 71 is referred to as the "closed state". When the user wears the earphone 1R on the right ear and the opening and closing valve 70 is in the closed state, the path 71 is blocked by the opening and closing valve 70R and the ear of the user is sealed.

A state in which the opening and closing valve 70R shown in FIG. 4 is separated from the wall surface 72 by a certain distance and the path 71 is opened is referred to as the "open state". The opening and closing valve 70R is movable in the direction DR1, and when the opening and closing valve 70R is separated from the wall surface 72, the path 71 is opened. When the user wears the earphone 1R on the right ear and the opening and closing valve 70R is in the open state, the path 71 is not blocked by the opening and closing valve 70R and communicates with the ambient environment on the side of the touch sensor TCR, and thus the ear of the user is not sealed. In this state, the sound remaining in the housing HOR is released to the outside of the housing HOR via the path 71, and thus when the user speaks while wearing the earphone 1R, it is expected to prevent the user from feeling uncomfortable or having difficulty in hearing when listening to external sounds.

Figure 5:
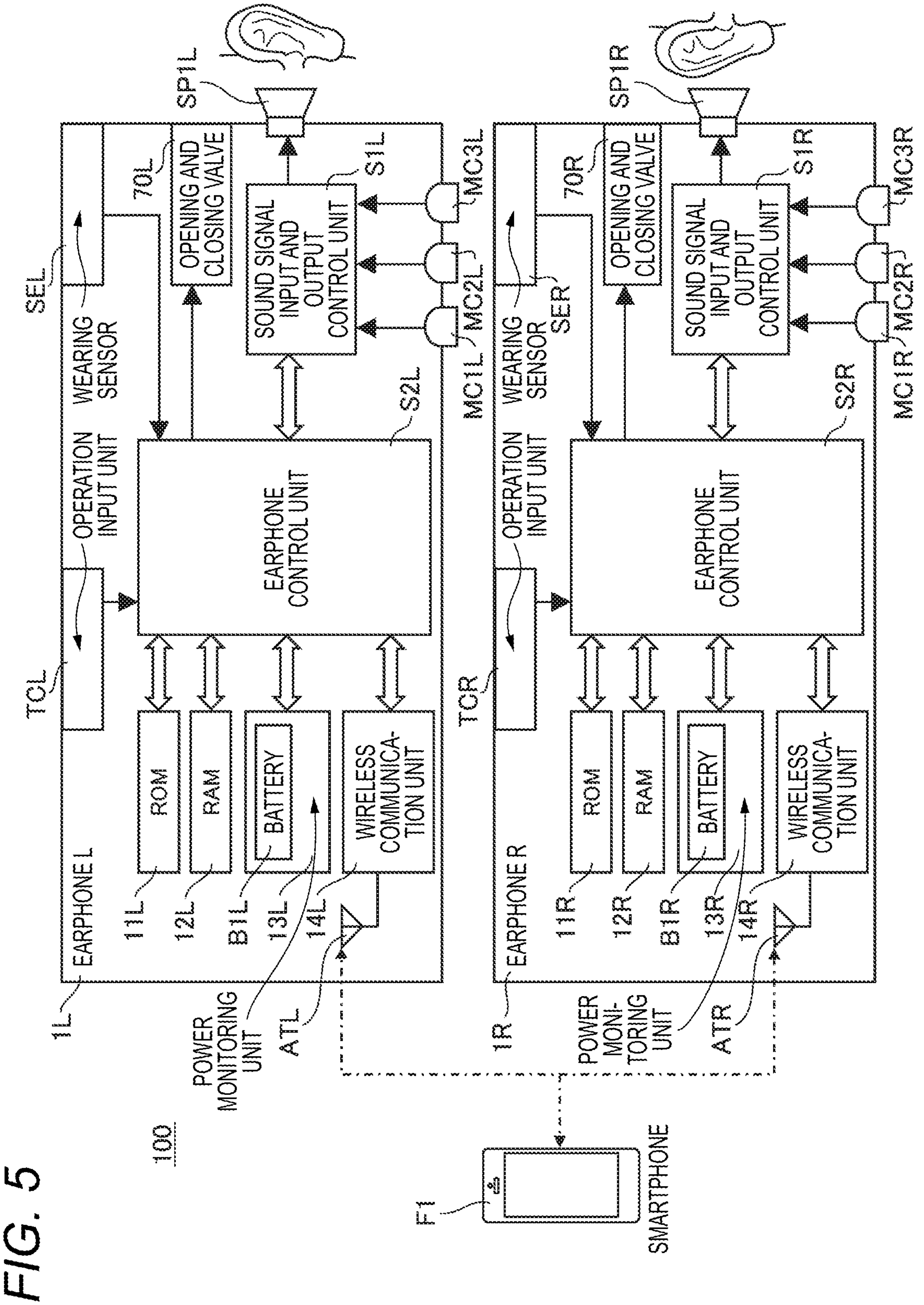
FIG. 5 shows a block diagram of the earphone according to a present embodiment.

Next, a block diagram of the earphone will be described with reference to FIG. 5. FIG. 5 shows the block diagram of the earphone according to the present embodiment. FIG. 5 shows block diagrams of the pair of left and right earphones 1L and 1R shown in FIGS. 1 and 2. A configuration of the earphone 1L of the pair of left and right earphones 1L and 1R will be described below, and a configuration of the earphone 1R is the same as that of the earphone 1L. Therefore, description of the earphone 1R is also omitted in FIG. 5.

An earphone control system 100 includes the earphone 1L, the earphone 1R, and the smartphone F1.

The touch sensor TCL, which is an example of the operation input unit, is communicably connected to the earphone control unit S2L. The touch sensor TCL outputs a signal related to the touch operation performed by the user to the earphone control unit S2L.

The wearing sensor SEL is communicably connected to the earphone control unit S2L, and outputs a signal related to whether the ear of the user is in contact with the earphone 1L to the earphone control unit S2L.

A power monitoring unit 13L is implemented with, for example, a semi-conductor chip. The power monitoring unit 13L includes the battery B1L and measures a remaining charge amount of the battery B1L. The battery B1L is, for example, a lithium ion battery. The power monitoring unit 13L outputs information related to the measured remaining charge amount of the battery B1L to the earphone control unit S2L.

The sound signal input and output control unit S1L is implemented with, for example, a processor such as a central processing unit (CPU), a micro processing unit (MPU), or a digital signal processor (DSP). The sound signal input and output control unit S1L is communicably connected to the earphone control unit S2L, and exchanges a sound signal as a digital signal converted into a digital format by a pulse code modulation (PCM) method. The sound signal input and output control unit S1L adjusts a volume level of a digital signal related to a sound signal acquired from the smartphone F1 and outputs the digital signal to the speaker SP1L.

The sound signal input and output control unit S1L is connected to the microphone MC1L, the microphone MC2L, and the microphone MC3L, and receives, from the microphones, sound signals picked up by the microphones. The sound signal input and output control unit S1L may be capable of performing processing such as amplifying the sound signals input from the microphones or converting an analog signal into a digital signal. The sound signal input and output control unit S1L transmits data of the sound signals input from the microphones to the earphone control unit S2L.

As an example of a control unit, the earphone control unit S2L is implemented with a processor such as a CPU, an MPU, or a DSP, is communicably connected to the sound signal input and output control unit S1L, a ROM 11L, a RAM 12L, the power monitoring unit 13L, an opening and closing valve 70L, and a wireless communication unit 14L, and exchanges a sound signal as a digital signal converted into a digital format by a PCM method. The earphone control unit S2L functions as a controller that controls the overall operation of the earphone 1L, and performs control processing for controlling operations of the units of the earphone 1L, input and output processing of data with the units of the earphone 1L, arithmetic processing of data, and storage processing of data.

The sound signal input and output control unit S1L and the earphone control unit S2L implement respective functions by using programs and data stored in the ROM (read only memory) 11L. The sound signal input and output control unit S1L and the earphone control unit S2L may use the RAM (random access memory) 12L during operation and temporarily store generated or acquired data or information in the RAM 12L.

The wireless communication unit 14L wirelessly connects the earphone 1L and the smartphone F1 so as to enable transmission and reception, and transmits a sound signal processed by the sound signal input and output control unit S1L or the earphone control unit S2L to the smartphone F1. The wireless communication unit 14L includes an antenna ATL and performs short-range wireless communication according to, for example, a communication standard of Bluetooth (registered trademark). The wireless communication unit 14L may be provided to be connectable to a communication line such as Wi-Fi (registered trademark) or a mobile communication line. The earphones 1L and 1R can individually perform wireless communication with the smartphone F1 using the respective wireless communication unit 14L and a wireless communication unit 14R. Therefore, the earphones 1L and 1R can receive data, a sound signal, or information transmitted from the smartphone F1.

The opening and closing valve 70L is communicably connected to the earphone control unit S2L. The opening and closing valve 70L operates (that is, opens and closes) based on a signal from the earphone control unit S2L. The opening and closing valve 70L is controlled to be in the open state or the closed state by the earphone control unit S2L based on, for example, contents set from a setting screen displayed on the smartphone F1. In the present embodiment, for example, the opening and closing valve 70L is controlled based on a moving speed of the user. The method of controlling the opening and closing valve 70L is not limited thereto, and the opening and closing valve 70L may be controlled depending on whether a call is in progress.

The smartphone F1 is a wireless terminal carried by the user.

Figure 6:
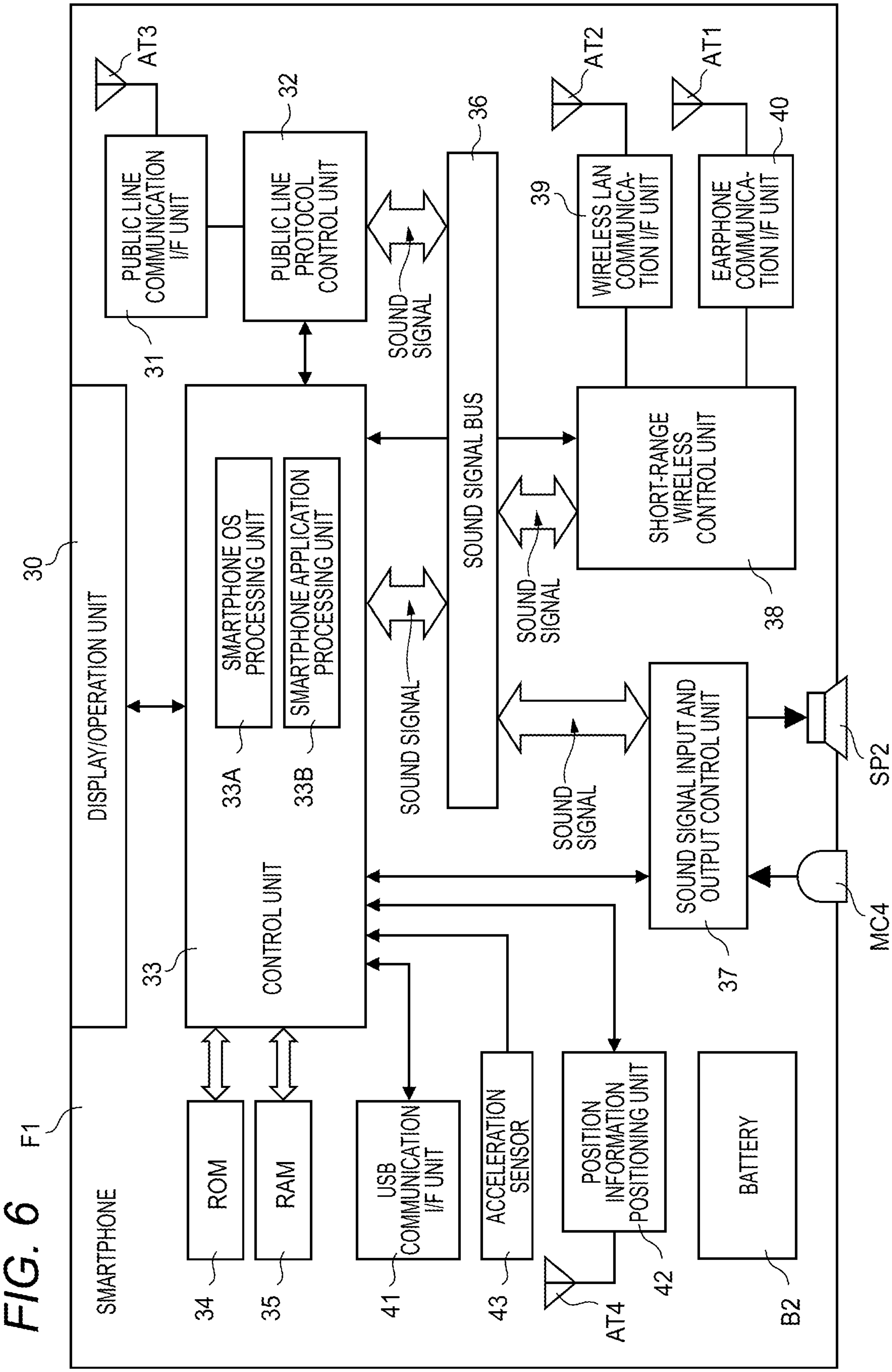
FIG. 6 is a block diagram of a smartphone according to the present embodiment.

Next, a hardware configuration example of a smartphone will be described with reference to a block diagram of the smartphone in FIG. 6. FIG. 6 is block diagram of the smartphone according to the present embodiment. The smartphone F1 includes a display/operation unit 30, a public line communication I/F unit 31, a public line protocol control unit 32, a control unit 33, a ROM 34, a RAM 35, a sound signal bus 36, a sound signal input and output control unit 37, a short-range wireless control unit 38, a wireless LAN communication I/F unit 39, an earphone communication I/F unit 40, a USB communication I/F unit 41, a position information positioning unit 42, an acceleration sensor 43, and a battery B2. In FIG. 6, an interface is abbreviated as "I/F".

The display/operation unit 30 as an example of a display unit or an operation unit is implemented with a touch panel that receives an operation of the user and displays data generated by the control unit 33, and forms a user interface. The display/operation unit 30 may display various screens generated by the control unit 33. The display/operation unit 30 receives user operations on the various displayed screens, generates input signals, and transmits the input signals to the control unit 33.

The public line communication I/F unit 31 is connected to an antenna AT3 provided in the smartphone F1, and performs wireless communication (for example, wireless communication conforming to 4G (fourth generation mobile communication scheme) or 5G (fifth generation mobile communication scheme) such as long term evolution (LTE)) with a public base station (not shown) using a public line. The public line communication I/F unit may be omitted from the configuration of the smartphone F1.

The public line protocol control unit 32 executes control related to input and output of data between the sound signal bus 36 and the public line communication OF unit 31. The public line protocol control unit 32 may be omitted from the configuration of the smartphone F1.

The control unit 33 is implemented with, for example, a processor such as a CPU, an MPU, or a DSP. A smartphone OS processing unit 33A and a smartphone application processing unit 33B are functionally provided, and the smartphone OS processing unit 33A and the smartphone application processing unit 33B cooperate with the ROM 34 to perform various types of processing and control. The control unit 33 calculates a speed of movement (hereinafter, referred to as a moving speed) of the user based on position information of the smartphone F1 (in other words, position information of the user) acquired from the position information positioning unit 42. The moving speed of the user may be measured by an external terminal and acquired by the smartphone F1.

A program that defines an operation of the control unit 33 and data used when the program is executed are written in the ROM 34. The ROM 34 stores identification information of the smartphone F1 and identification information of the earphone 1 registered in advance as a transmission target of a sound signal. The ROM 34 may store information related to the moving speed of the user. The information related to the moving speed of the user is, for example, information related to a statistical standard speed range in which the user is estimated to be walking. The information related to the moving speed of the user is not limited to the information related to a statistical standard speed range in which the user is estimated to be walking, and may be information related to a statistical standard speed range in which the user is estimated to be running or cycling. For example, the speed range in which the user is estimated to be walking is 3 [km/h] to 6 [km/h]. The speed range in which the user is estimated to be walking is an example and is not limited thereto. The information related to the moving speed of the user may be predetermined and stored in the ROM 34, or may be freely determined by the user (see FIG. 8).

The RAM 35 is a RAM serving as a work memory used when various types of processing of the control unit 33 are executed. The RAM 35 temporarily stores data or information generated or acquired by the control unit 33.

The sound signal bus 36 inputs and outputs sound signal data to and from the control unit 33, the public line protocol control unit 32, the sound signal input and output control unit 37, and the short-range wireless control unit 38.

Based on a command output from the control unit 33, the sound signal input and output control unit 37 transmits sound signal data picked up by a microphone MC4 to the control unit 33 via the sound signal bus 36, and causes the sound signal input via the sound signal bus 36 to be output from a speaker SP2.

The microphone MC4 picks up a voice based on a speech of the user who uses the smartphone F1, converts the voice into a sound signal, and transmits the converted sound signal to the sound signal input and output control unit 37. The sound signal picked up by the microphone MC4 is input to the control unit 33 via the sound signal input and output control unit 37 and the sound signal bus 36.

The speaker SP2 acoustically outputs the sound signal data from the sound signal input and output control unit 37.

The short-range wireless control unit 38 executes control related to input and output of data between the sound signal bus 36 and the wireless LAN communication I/F unit 39 and between the sound signal bus 36 and the earphone communication I/F unit 40. The short-range wireless control unit 38 transmits the command output from the control unit 33 and the sound signal data input via the sound signal bus 36 to the wireless LAN communication I/F unit 39 or the earphone communication I/F unit 40. In addition, the short-range wireless control unit 38 may transmit the sound signal data input from the wireless LAN communication I/F unit 39 or the earphone communication I/F unit 40 to the control unit 33.

The wireless LAN communication I/F unit 39 is connected to an antenna AT2 provided in the smartphone F1, and performs wireless communication (for example, data transmission from the short-range wireless control unit 38) with the earphone 1 by wireless LAN. The wireless LAN communication I/F unit 39 is implemented with a communication circuit connectable to the Internet via a wireless LAN router (not shown). The wireless LAN communication I/F unit 39 may perform wireless communication (for example, wireless LAN such as Wi-Fi (registered trademark)) with the earphones 1L and 1R via the wireless LAN router (not shown) described above.

The earphone communication I/F unit 40 is connected to an antenna AT1 provided in the smartphone F1, and performs short-range wireless communication (for example, data transmission from the short-range wireless control unit 38) with the earphone 1 by Bluetooth (registered trademark).

The USB communication I/F unit 41 is an interface that allows the smartphone F1 and an external device (for example, a personal computer (PC)) to communicate with each other by a wire such as a cable. The USB communication I/F unit 41 is connected to the control unit 33 so as to perform data communication, and can transmit data from an external device to the control unit 33. In addition, electric charge may be supplied from an external commercial power supply to the battery B2 via the USB communication OF unit 41.

The position information positioning unit 42 is, for example, a global positioning system (GPS) receiver. The position information positioning unit 42 is connected to an antenna AT4 provided in the smartphone F1, and receives a plurality of signals indicating times transmitted from a plurality of navigation satellites (that is, GPS satellites) and positions (coordinates) of the GPS satellites. The position information positioning unit 42 calculates a position of the GPS receiver (that is, a position of the smartphone F1) based on the plurality of received signals. The position information positioning unit 42 outputs the position information of the smartphone F1 to the control unit 33.

The acceleration sensor 43 measures acceleration of the smartphone F1. The acceleration of the smartphone F1 is, in other words, acceleration of the movement of the user carrying the smartphone F1. The acceleration sensor 43 is, for example, an inertial sensor that detects a three-dimensional inertial motion (translational motion in orthogonal three-axis directions). The acceleration sensor 43 transmits the measured acceleration of the smartphone F1 to the control unit 33.

The battery B2 supplies power to the smartphone F1, which is a battery capable of storing electric charge supplied from an external commercial power supply. The battery B2 may be detachable. The battery B2 may directly obtain power supply from an external commercial power supply, or may supply power to the smartphone F1 in a state of being disconnected from the external commercial power supply.

Figure 7:
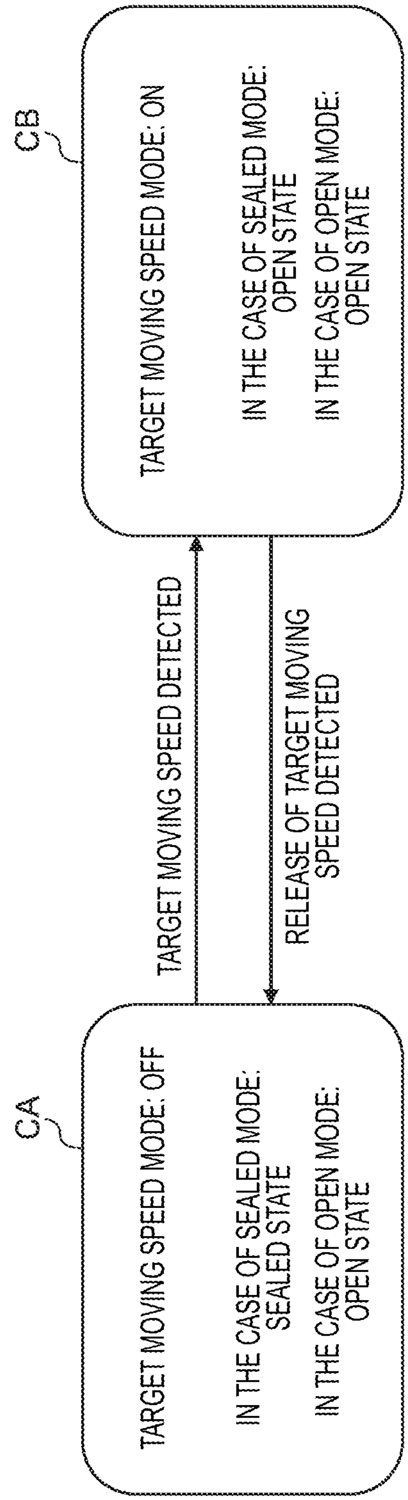
FIG. 7 is a diagram illustrating a target moving speed mode.

Next, a target moving speed mode will be described with reference to FIG. 7. FIG. 7 is a diagram illustrating the target moving speed mode.

When a moving speed of the user calculated by the control unit 33 of the smartphone F1 is a speed within a predetermined range, the moving speed of the user is referred to as a target moving speed. The predetermined range is a predetermined range stored in the ROM 34 or a range set by the user (see FIG. 8). A mode in which the opening and closing valve 70L and the opening and closing valve 70R are controlled using information on the target moving speed is referred to as a target moving speed mode. When the control unit 33 determines that the user is moving at the target moving speed, the target moving speed mode is turned on. When the control unit 33 determines that the user is not moving at the target moving speed, the target moving speed mode is turned off. The case where the user is not moving at the target moving speed is, for example, a case where the user is stationary or moving at high speed by a train or the like.

A sealed mode and an open mode are modes related to whether the earphone 1 is in the open state or the closed state. The sealed mode is, for example, a mode when the user is listening to music. What the user listens to is not limited to music, but may be sound signals related to video data, recorded data, or the like. The open mode is, for example, a mode when the user is speaking on the phone or the like. The examples of the sealed mode and the open mode are merely examples and are not limited to the above.

When detecting that the moving speed of the user reaches the target moving speed, the control unit 33 of the smartphone F1 turns on the target moving speed mode. When detecting that the moving speed of the user deviates from the target moving speed, the control unit 33 of the smartphone F1 turns off the target moving speed mode.

A case CA represents a sealed state of the earphone 1 when the target moving speed mode is off. When the target moving speed mode is off and the sealed mode is set, the earphone 1 is in the closed state. When the target moving speed mode is off and the open mode is set, the earphone 1 is in the open state.

A case CB represents a sealed state of the earphone 1 when the target moving speed mode is on. When the target moving speed mode is on and the sealed mode is set, the earphone 1 is in the open state. When the target moving speed mode is on and the open mode is set, the earphone 1 is in the open state. That is, in the case CB, the earphone 1 is in the open state regardless of the sealed mode and the open mode.

Figure 8:
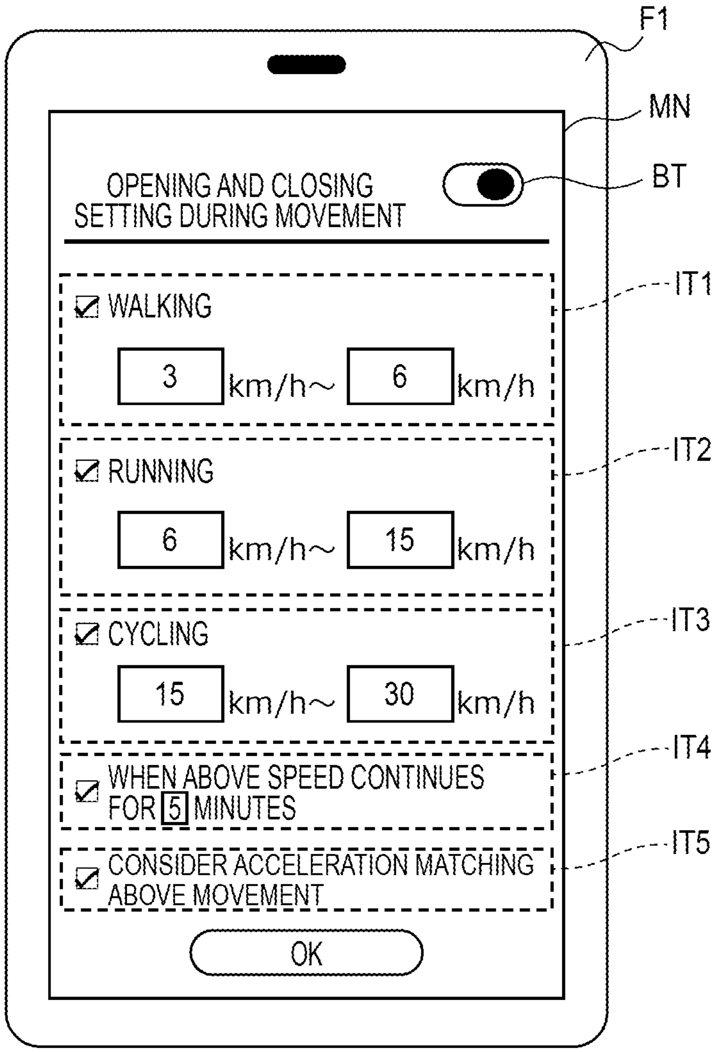
FIG. 8 is a diagram showing an example of a screen for opening and closing setting during movement.

Next, with reference to FIG. 8, an example of a screen for opening and closing setting during movement will be described. FIG. 8 is a diagram showing an example of a screen for the opening and closing setting during movement.

A screen MN for opening and closing setting during movement is an example of a screen displayed on the display/operation unit 30 of the smartphone F1. The smartphone application processing unit 33B displays the screen MN for opening and closing setting during movement on the display/operation unit 30.

The screen MN for opening and closing setting during movement is a screen for the setting (hereinafter, referred to as the opening and closing setting during movement) related to the opening and closing of the opening and closing valve 70L and the opening and closing valve 70R based on the moving speed of the user.

A button BT is a button for switching ON and OFF of the opening and closing setting during movement.

An item IT1 is an item for setting a target moving speed range in which the user is estimated to be walking. The target moving speed range set in the item IT1 is, for example, 3 [km/h] to 6 [km/h]. The target moving speed range set in the item IT1 may be a predetermined range or may be freely set by the user. The target moving speed range is an example and is not limited to 3 [km/h] to 6 [km/h]. The target moving speed range of the item IT1 is defined as a first range in which the target moving speed is equal to or higher than a first speed and equal to or lower than a second speed higher than the first speed.

An item IT2 is an item for setting a target moving speed range in which the user is estimated to be running. The target moving speed range set in the item IT2 is, for example, 6 [km/h] to 15 [km/h]. The target moving speed range set in the item IT2 may be a predetermined range or may be freely set by the user. The target moving speed range is an example and is not limited to 6 [km/h] to 15 [km/h]. The target moving speed range of the item IT2 is defined as a second range in which the target moving speed is equal to or higher than a third speed equal to or higher than the second speed and is equal to or lower than a fourth speed higher than the third speed.

An item IT3 is an item for setting a target moving speed range in which the user is estimated to be cycling. The target moving speed range set in the item IT3 is, for example, 15 [km/h] to 30 [km/h]. The target moving speed range set in the item IT3 may be a predetermined range or may be freely set by the user. The range of the target moving speed is an example and is not limited to 15 [km/h] to 30 [km/h]. The target moving speed range of the item IT3 is defined as a third range in which the target moving speed is equal to or higher than a fifth speed equal to or higher than the fourth speed and is equal to or lower than a sixth speed higher than the fifth speed.

As a result, when the moving speed of the user falls within at least one of the first range, the second range, and the third range, the smartphone F1 transmits the signal indicating that the moving speed is a speed within a predetermined range to the earphone 1L and the earphone 1R. The earphone control unit S2L of the earphone 1L controls the opening and closing valve 70L based on a signal from the smartphone F1. The earphone control unit S2R of the earphone 1R controls the opening and closing valve 70R based on a signal from the smartphone F2.

The number of target moving speed ranges that can be set is not limited to three of walking, running, and cycling, and may be three or more.

An item IT4 is an item for setting that the opening and closing valve 70R and the opening and closing valve 70L are controlled to be in the open state when the moving speed of the user continues to be the target moving speed for a predetermined time or longer. That is, in a case where the user presses and checks the item IT4, when determining that the moving speed of the user continues to be the target moving speed, the smartphone F1 transmits a signal indicating that the moving speed of the user is the target moving speed to the earphone 1. Hereinafter, a time used for determining whether the moving speed of the user continues to be the target moving speed is referred to as a duration time. The duration time may be a predetermined time or may be freely set by the user. The duration time is, for example, five minutes. The duration time is not limited to five minutes.

An item IT5 is an item for setting whether to consider the acceleration of the moving speed of the user. That is, the smartphone F1 determines whether acceleration related to the movement of the user measured by the acceleration sensor 43 of the smartphone F1 is an appropriate value for a moving speed in the first range, the second range, or the third range. When determining that the acceleration is within a predetermined range for the target moving speed range, the smartphone F1 transmits a signal indicating that the moving speed of the user is the target moving speed to the earphone 1. A value of the acceleration in the predetermined range may be stored in the ROM 34.

Figure 9:
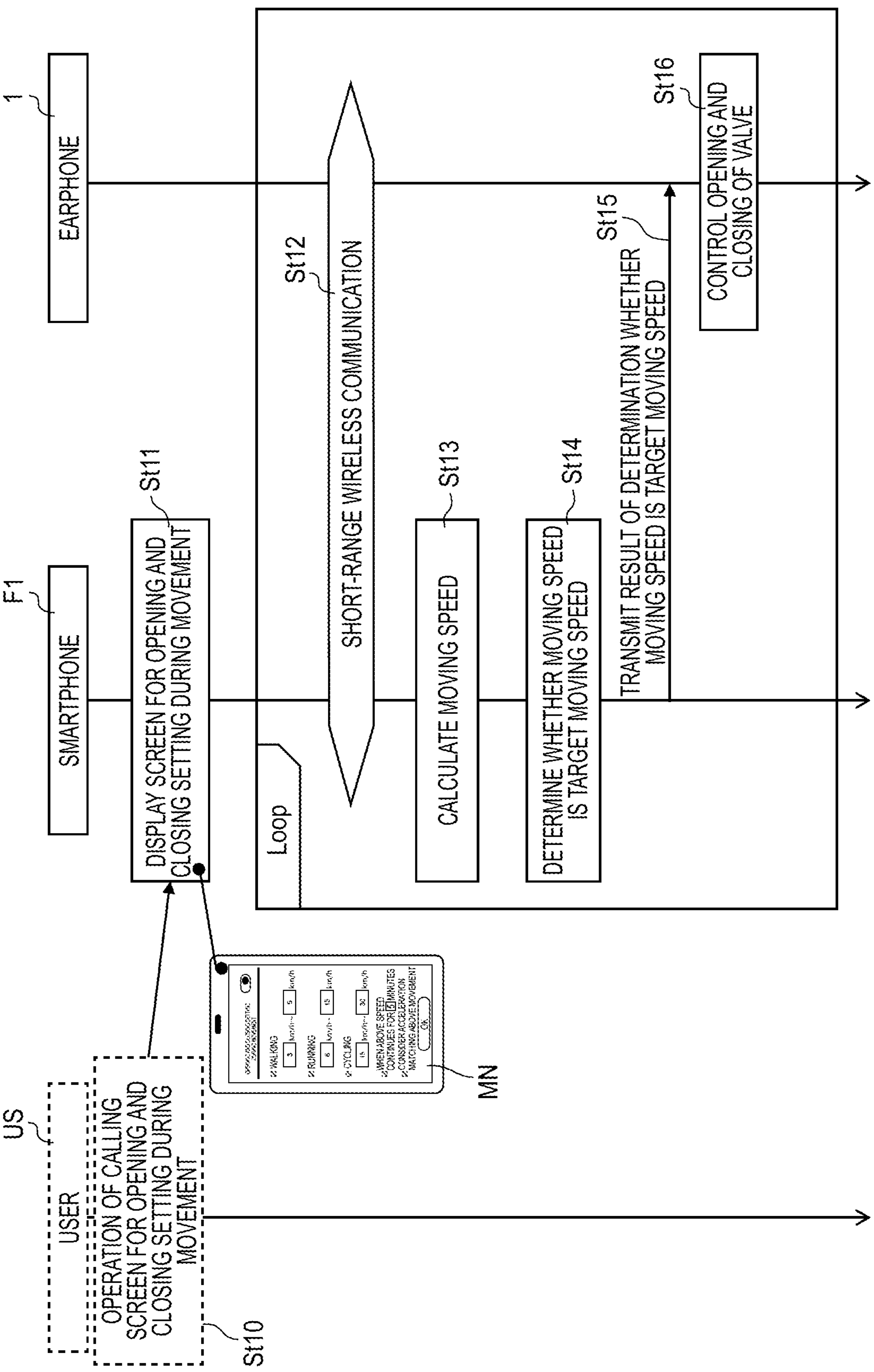
FIG. 9 is a sequence diagram of processing related to opening and closing control of an opening and closing valve of an earphone control system.

Next, processing related to opening and closing control of an opening and closing valve of an earphone control system will be described with reference to FIG. 9. FIG. 9 is a sequence diagram of the processing related to the opening and closing control of the opening and closing valve of the earphone control system.

The user performs an operation of calling the screen MN for opening and closing setting during movement on the display/operation unit 30 of the smartphone F1 (St 10).

The smartphone F1 displays the screen MN for opening and closing setting during movement on the display/operation unit 30 based on the operation of the user in the processing of step St 10 (St 11).

The smartphone F1 starts short-range wireless communication (for example, Bluetooth (registered trademark) communication) with the earphone 1 (St 12). Bluetooth (registered trademark) communication with the earphone 1 in the processing of step St 12 may be started by an operation of the user or may be automatically started by setting of the smartphone F1.

The control unit 33 of the smartphone F1 calculates a moving speed of the user based on a signal of the position information positioning unit 42 (St 13). The moving speed of the user may be measured by an external terminal capable of measuring the moving speed, and the smartphone F1 may acquire a measurement result.

The control unit 33 of the smartphone F1 determines whether the moving speed of the user calculated in the processing of step St 13 is the target moving speed (St 14).

The smartphone F1 transmits a result of the processing in step St 14 to the earphone 1 (St 15).

The earphone 1 executes the opening and closing control of the opening and closing valve 70R and the opening and closing valve 70L based on the information regarding whether the moving speed of the user acquired in the processing of step St15 is the target moving speed (St16).

The smartphone F1 and the earphone 1 repeatedly execute the processes from step St 12 to step St 16.

Figure 10:
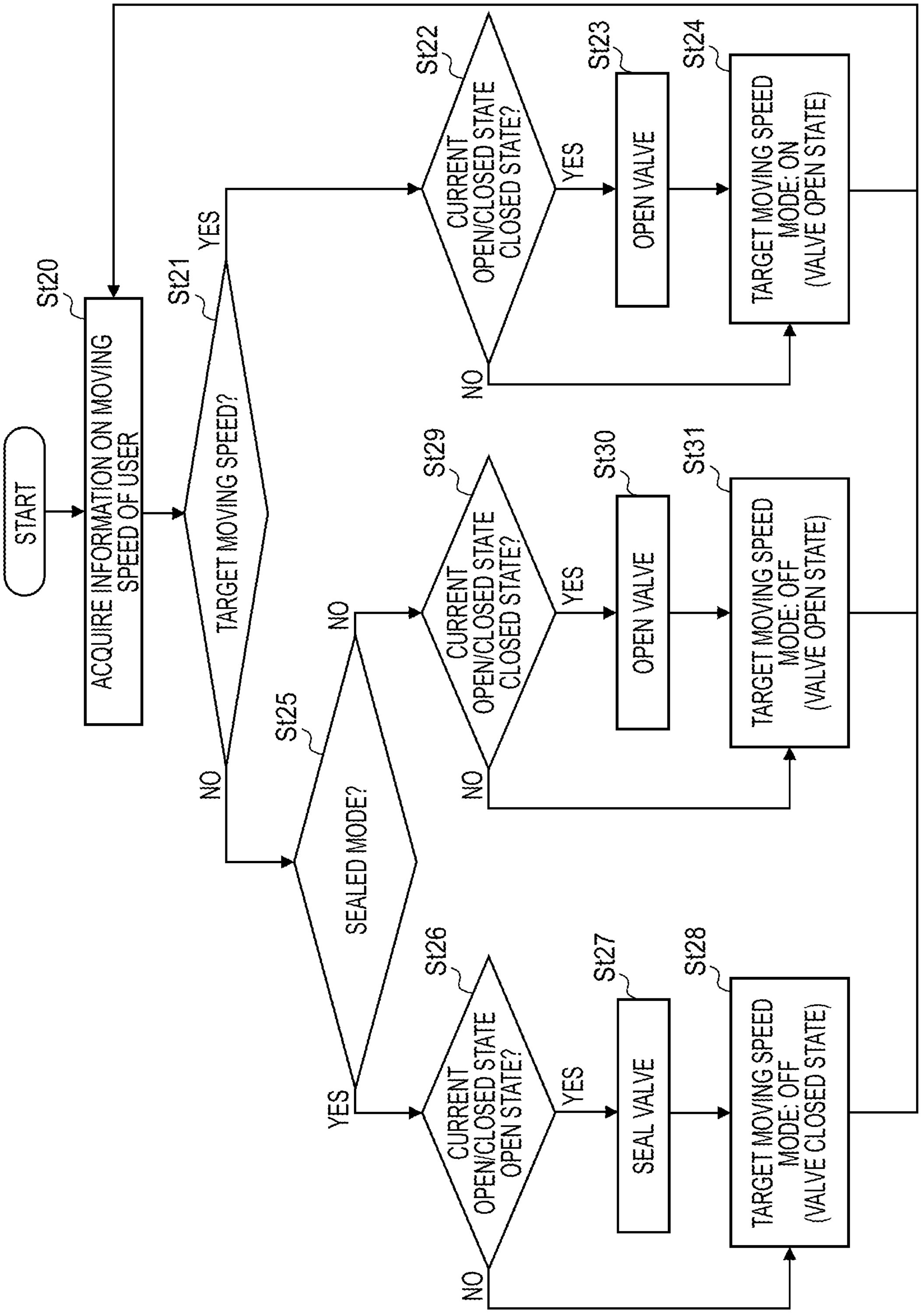
FIG. 10 is a flowchart of processing related to control of the opening and closing valve according to a moving speed of a user.

Next, processing related to control of the opening and closing valve according to the moving speed of the user will be described with reference to FIG. 10. FIG. 10 is a flowchart of the processing related to the control of the opening and closing valve according to the moving speed of the user. The processes according to the flowchart of FIG. 10 is executed by the earphone control unit S2L and the earphone control unit S2R. Since the earphone control unit S2L and the earphone control unit S2R execute the same processing, the execution by the earphone control unit S2L will be described here, and the description of the execution by the earphone control unit S2R will be omitted.

The earphone control unit S2L acquires information related to the moving speed of the user transmitted from the smartphone F1 (St 20). The information related to the moving speed of the user is information related to whether the moving speed of the user is the target moving speed acquired from the smartphone F1 in the processing of step St 15 of FIG. 9.

When the control unit 33 of the smartphone F1 determines that the moving speed of the user is the target moving speed (YES in St 21), the earphone control unit S2L determines whether the opening and closing valve 70L is currently in the closed state (St 22).

When determining that the opening and closing valve 70L is currently not in the closed state (that is, the opening and closing valve 70L is in the open state) (NO in St 22), the earphone control unit S2L keeps the opening and closing valve 70L in the open state and turns on the target moving speed mode (St 24). The processing of the earphone phone control unit S2L returns to the processing of step St 20 after the processing of step St 24.

When determining that the opening and closing valve 70L is currently in the closed state (YES in St 22), the earphone control unit S2L controls and sets the opening and closing valve 70L to the open state (St 23).

After setting the opening and closing valve 70L to the open state in the processing of step St 23, the earphone control unit S2L turns on the target moving speed mode (St 24). The processing of the earphone phone control unit S2L returns to the processing of step St 20 after the processing of step St 24.

When the control unit 33 of the smartphone F1 determines that the moving speed of the user is not the target moving speed (NO in St 21), the earphone control unit S2L determines whether the mode of the earphone 1L is the sealed mode (St 25). For example, when the moving speed of the user which is the target moving speed deviates from the target moving speed, the control unit 33 of the smartphone F1 determines that the moving speed is not the target moving speed.

When determining that the mode of the earphone 1L is the sealed mode (YES in St 25), the earphone control unit S2L determines whether the opening and closing valve 70L is currently in the open state (St 26).

When determining that the opening and closing valve 70L is currently not in the open state (that is, the opening and closing valve 70L is in the closed state) (NO in St 26), the earphone control unit S2L keeps the opening and closing valve 70L in the closed state and turns off the target moving speed mode (St 28). The processing of the earphone phone control unit S2L returns to the processing of step St 20 after the processing of step St 28.

When determining that the opening and closing valve 70L is currently in the open state (YES in St 26), the earphone control unit S2L controls and sets the opening and closing valve 70L to the closed state (St 27).

After setting the opening and closing valve 70L to the closed state in the processing of step St 27, the earphone control unit S2L turns off the target moving speed mode (St 28). The processing of the earphone phone control unit S2L returns to the processing of step St 20 after the processing of step St 28.

When determining that the mode of the earphone 1L is not the sealed mode (that is, the earphone 1L in the open mode) (NO in St 25), the earphone control unit S2L determines whether the opening and closing valve 70L is currently in the closed state (St 29).

When determining that the opening and closing valve 70L is currently not in the closed state (that is, the opening and closing valve 70L is in the open state) (NO in St 29), the earphone control unit S2L keeps the opening and closing valve 70L in the open state and turns off the target moving speed mode (St 31). The processing of the earphone phone control unit S2L returns to the processing of step St 20 after the processing of step St 31.

When determining that the opening and closing valve 70L is currently in the closed state (YES in St 29), the earphone control unit S2L controls and sets the opening and closing valve 70L to the open state (St 30).

After setting the opening and closing valve 70L to the open state in the processing of step St 30, the earphone control unit S2L turns off the target moving speed mode (St 31). The processing of the earphone phone control unit S2L returns to the processing of step St 20 after the processing of step St 31.

As described above, a control system (for example, the earphone control system 100) according to the present embodiment includes earphones (for example, the earphone 1) worn on left and right ears of a user, respectively, and a wireless terminal (for example, the smartphone F1) carried by the user. The earphone includes a housing (for example, the housing HOL and the housing HOR) having a space therein and an air-permeable path from one end of an ear canal of the user to the other end of the ambient environment. The earphone includes an opening and closing valve (for example, the opening and closing valve 70L and the opening and closing valve 70R) that is accommodated in the housing and can block a part of the path. When determining that a moving speed of the user is within a predetermined range, the wireless terminal transmits a signal indicating that the moving speed is a speed within the predetermined range to the earphone. The earphone controls the opening and closing valve based on the signal acquired from the wireless terminal.

As a result, the control system can set the opening and closing valve of the earphone to an open state when the moving speed of the user is a speed within a predetermined range, that is, when the moving speed is a target moving speed. The control system opens the opening and closing valve while the user is moving, thereby improving the audibility of external sounds. When the user listens to music or the like with the earphone, it is possible to reduce sound reflection in a body of the user and improve the audibility. As a result, the control system can control a sealed state or an open state of the earphone worn on the ear of the user according to a movement state of the user and to prevent the user from feeling uncomfortable.

The earphone according to the present embodiment determines whether the opening and closing valve is in a closed state based on a signal acquired from the wireless terminal, and opens the opening and closing valve to set the opening and closing valve to an open state when determining that the state of the opening and closing valve is the closed state. As a result, the control system can open the opening and closing valve based on the moving speed of the user. As a result, the control system can automatically execute the control related to the opening and closing of the opening and closing valve without requiring the user to perform an operation of switching the opening and closing of the opening and closing valve to the wireless terminal or the earphone.

When the moving speed falls within at least one of a first range, a second range, and a third range, the wireless terminal of the control system according to the present embodiment transmits a signal indicating that the moving speed is a speed within a predetermined range to the earphone. The first range is a range in which the moving speed is equal to or higher than a first speed and equal to or lower than a second speed higher than the first speed. The second range is a range in which the moving speed is equal to or higher than a third speed equal to or higher than the second speed and equal to or lower than a fourth speed higher than the third speed. The third range is a range in which the moving speed is equal to or higher than a fifth speed equal to or higher than the fourth speed and is equal to or lower than a sixth speed higher than the fifth speed. As a result, when the moving speed of the user falls within at least one of the first range, the second range, and the third range (that is, when the moving speed of the user is the target moving speed), the control system can set the earphone to the open state.

The first range of the control system according to the present embodiment is a ranged of a standard moving speed when the user moves by walking. The second range is a range of a standard moving speed when the user moves by running. The third range is a range of a standard moving speed when the user moves by cycling. As a result, when the user moves by walking, running, or cycling, the control system can execute the control related to the opening and closing of the opening and closing valve, and it is possible to improve the ease of the user listening to external sounds while the user is moving by walking, running, or cycling.

When the moving speed falls within a range selected by the user among the first range, the second range, and the third range, the wireless terminal of the control system according to the present embodiment transmits a signal indicating that the moving speed is a speed within a predetermined range to the earphone. Thereby, the control system can control the sealed or open state of the earphone based on the setting determined by the user. As a result, it is possible to improve the convenience of using the earphones for the user.

Values of the first speed, the second speed, the third speed, the fourth speed, the fifth speed, and the sixth speed of the control system according to the present embodiment are freely set by a user operation on the wireless terminal. Thereby, the control system can set the range of the target moving speed according to a walking speed, a running speed, and a cycling speed of each user. As a result, it is possible to improve the convenience of using the earphones for the user.

When determining that the moving speed is continuously within the predetermined range for a predetermined time or longer, the wireless terminal of the control system according to the present embodiment transmits a signal indicating that the moving speed is a speed within the predetermined range to the earphone. As a result, the control system can reduce erroneous detection and control the sealed or open state of the earphone with high accuracy.

The wireless terminal of the control system according to the present embodiment measures acceleration related to the movement of the user, and when determining that the acceleration is within a seventh range, the wireless terminal transmits a signal indicating that the moving speed is a speed within a predetermined range to the earphone. As a result, the control system can reduce erroneous detection and control the sealed or open state of the earphone with high accuracy.

The wireless terminal of the control system according to the present embodiment includes a display unit (for example, the display/operation unit 30), and displays a screen (for example, the screen MN for opening and closing setting during movement) for opening and closing setting of the opening and closing valve related to movement of the user on the display unit. The screen includes a button for setting whether to execute the control of opening and closing of the opening and closing valve related to the movement. The screen includes a field for setting the first range, a field for setting the second range, and a field for setting the third range. The screen includes a field for setting whether to consider that the moving speed is continuously within a predetermined range for a predetermined time or longer, and a field for setting whether to consider the acceleration. As a result, the control system can determine the setting for controlling the sealed or open state of the earphone by the user. As a result, it is possible to improve the convenience of using the earphones for the user.

Although the embodiment has been described above with reference to the accompanying drawings, the present disclosure is not limited to such an example. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. The components in the embodiment described above may be freely combined without departing from the gist of the invention.

INDUSTRIAL APPLICABILITY

The technique of the present disclosure is useful as a control system, an earphone, and a control method for controlling a sealed state or an open state of an earphone worn on an ear of a user according to a movement state of the user and to prevent the user from feeling uncomfortable.

What is claimed is:

1. A control system comprising:

earphones, each of the earphones including a housing having a space therein and an air-permeable path from one end configured to be located at an ear canal of a user to another end configured to be located at an ambient environment, and an opening and closing valve accommodated in the housing and capable of blocking a part of the path, the earphones configured to be worn on left and right ears of the user, respectively; and a wireless terminal carried by the user, wherein in response to determining that a moving speed of the user is within a predetermined range, the wireless terminal transmits a signal indicating that the moving speed is a speed within the predetermined range to the earphones, each of the earphones control the opening and closing valve based on the signal acquired from the wireless terminal, each of the earphones determines whether the opening and closing valve is in a closed state based on the signal acquired from the wireless terminal, and in response to determining that a state of the opening and closing valve is the closed state, the earphones open the opening and closing valve to set the opening and closing valve to an open state.

2. A control system comprising:

earphones, each of the earphones including a housing having a space therein and an air-permeable path from one end configured to be located at an ear canal of a user to another end configured to be located at an ambient environment, and an opening and closing valve accommodated in the housing and capable of blocking a part of the path, the earphones configured to be worn on left and right ears of the user, respectively; and a wireless terminal carried by the user, wherein in response to determining that a moving speed of the user is within a predetermined range, the wireless terminal transmits a signal indicating that the moving speed is a speed within the predetermined range to the earphones, each of the earphones control the opening and closing valve based on the signal acquired from the wireless terminal, when the moving speed falls within at least one of a first range in which the moving speed is equal to or higher than a first speed and equal to or lower than a second speed higher than the first speed, and a second range in which the moving speed is equal to or higher than a third speed equal to or higher than the second speed and equal to or lower than a fourth speed higher than the third speed, the wireless terminal transmits the signal indicating that the moving speed is a speed within the predetermined range to the earphones.

3. The control system according to claim 2, wherein when the moving speed falls within at least one of the first range, the second range, and a third range in which the moving speed is equal to or higher than a fifth speed equal to or higher than the fourth speed and equal to or lower than a sixth speed higher than the fifth speed, the wireless terminal transmits the signal indicating that the moving speed is a speed within the predetermined range to the earphones.

4. The control system according to claim 3, wherein the first range is a range of a standard moving speed when the user moves by walking, the second range is a range of a standard moving speed when the user moves by running, and the third range is a range of a standard moving speed when the user moves by cycling.

5. The control system according to claim 3, wherein when the moving speed falls within a range selected by the user among the first range, the second range, and the third range, the wireless terminal transmits the signal indicating that the moving speed is a speed within the predetermined range to the earphones.

6. The control system according to claim 3, wherein values of the first speed, the second speed, the third speed, the fourth speed, the fifth speed, and the sixth speed are freely set by a user operation on the wireless terminal.

7. The control system according to claim 1, wherein when determining that the moving speed is continuously within the predetermined range for a predetermined time or longer, the wireless terminal transmits the signal indicating that the moving speed is a speed within the predetermined range to the earphones.

8. The control system according to claim 1, wherein the wireless terminal measures acceleration related to movement of the user, and when determining that the acceleration is within a range, the wireless terminal transmits the signal indicating that the moving speed is a speed within the predetermined range to the earphones.

9. The control system according to claim 3, wherein the wireless terminal includes a display unit, and displays a screen for opening and closing setting of the opening and closing valve related to a movement of the user on the display unit, and the screen includes:

a button for setting whether to execute control of opening and closing of the opening and closing valve related to the movement, a first field for setting the first range, a second field for setting the second range, a third field for setting the third range, a moving speed field for setting whether to consider that the moving speed is continuously within a predetermined range for a predetermined time or longer, and an acceleration field for setting whether to consider acceleration.

10. An earphone communicably connected to a wireless terminal, the earphone comprising:

a housing having a space therein and an air-permeable path from one end configured to be located at an ear canal of a user to another end configured to be located at an ambient environment; and an opening and closing valve accommodated in the housing and capable of blocking a part of the path, wherein in response to a signal indicating that a moving speed of the user is within a predetermined range being acquired by the earphone and from the wireless terminal, the opening and closing valve is controlled based on the signal, the earphone determines whether the opening and closing valve is in a closed state based on the signal acquired from the wireless terminal, and in response to determining that a state of the opening and closing valve is the closed state, the earphone opens the opening and closing valve to set the opening and closing valve to an open state.

11. A control method for controlling earphones and a wireless terminal, each of the earphones including a housing having a space therein and an air-permeable path from one end configured to be located at of an ear canal of a user to another end configured to be located at an ambient environment, and an opening and closing valve accommodated in the housing and capable of blocking a part of the path, the earphones being worn on left and right ears of the user, respectively, the control method comprising:

transmitting, by the wireless terminal and to the earphones, a signal indicating that a moving speed of the user is within a predetermined range in response to determining that the moving speed is within the predetermined range, and controlling, by each of the earphones, the opening and closing valve based on the signal acquired from the wireless terminal;

determining, by each of the earphones, whether the opening and closing valve is in a closed state based on the signal acquired from the wireless terminal; and in response to determining that a state of the opening and closing valve is the closed state, opening, by each of the earphones, the opening and closing valve to set the opening and closing valve to an open state.

* * * * *